Patented Apr. 5, 1949

2,466,506

UNITED STATES PATENT OFFICE 2,466,506

FLUORIDE GLASSES

Kuan-Han Sun and Thomas E. Callear, Rochester, N. Y., assignors to Eastman Kodak Company, Rochester, N. Y., a corporation of New Jersey No Drawing. Application April 6, 1946,
Serial No. 660,308

7 Claims. (Cl. 106—47)

This invention relates to improved fluoride glass and particularly to a specific embodiment of the invention generically claimed in the application of Kuan-Han Sun, one of the present inventors, and Maurice L. Huggins, Serial No. 568,314, filed December 15, 1945.

As pointed out in that application, a glass can be made entirely of fluorides and among the many possibilities there pointed out are combinations of the fluorides of aluminum and beryllium with those of divalent metals. This present specification is specific to a glass consisting entirely or predominantly of the fluorides of magnesium, lead, aluminum, and beryllium. Glasses of such composition can be made in comparatively large batches.

Although in certain of the examples given in the above-mentioned application, lead fluoride is present in amounts up to 30 per cent by weight, we have found that it is possible to obtain useful glasses having a much greater proportion of lead, and at the same time, to reduce the amount of beryllium fluoride, a poor moisture-resisting and relatively expensive ingredient, to much less than in any of the examples given in that application.

Examples indicating the possible range of proportions will now be given, the letter W indicating weight per cent, and M the mole per cent of the several ingredients. In Formulas 2, 3, and 4 the amount of beryllium fluoride is particularly low, but a certain minimum amount appears to be necessary.

| Example | $MgF_2$ | | $PbF_2$ | | $AlF_3$ | | $BeF_2$ | |
|---|---|---|---|---|---|---|---|---|
| | W | M | W | M | W | M | W | M |
| 1 | 12.8 | 20 | 50.5 | 20 | 17.3 | 20 | 19.4 | 40 |
| 2 | 4.6 | 10 | 72.6 | 40 | 12.4 | 20 | 10.4 | 30 |
| 3 | 2.1 | 5 | 74.5 | 45 | 17.0 | 30 | 6.4 | 20 |
| 4 | 6.3 | 15 | 73.8 | 45 | 16.8 | 30 | 3.1 | 10 |

While the examples given above contain only the four fluorides mentioned, the introduction of small amounts of other compatible fluorides, particularly those of calcium, strontium, barium, lanthanum, cerium, and thorium, is usually advantageous in improving the chemical durability and devitrification. The glasses have an index of refraction for the D line well over 1.4.

In making these glasses, dry powdered materials are used. About 10 per cent of ammonium fluoride ($NH_4F$) or ammonium acid fluoride ($NH_4HF_2$) is usually added to the batch. The ingredients of the batch, except the lead fluoride, are mixed and melted down in a covered platinum crucible at a temperature between 850° and 900° C. to a clear liquid or a fused mass, and then the lead fluoride is added and heating continued. This procedure avoids the decomposition of the lead fluoride and the attacking of the platinum by free metallic lead. By this procedure, a platinum vessel can be safely used for melting the lead-containing glasses. The glass should be poured from the crucible as soon after the addition of the lead fluoride as a clear liquid is obtained. It may be poured out into a mold which may be cold or may be heated to a temperature of the order of 200° to 300° C.

Of these formulas, those having the larger percentages of lead fluoride and smaller amounts of beryllium are preferred, particularly Examples 3 and 4; that is, those in which the amount of lead fluoride is greater than 70 per cent by weight, although it is in all cases greater than 50 per cent, and in which beryllium fluoride is between 3 and 12 per cent by weight or 10 and 25 mole per cent, and in any event less than 20 per cent by weight. The total of the glass formers, aluminum and beryllium fluorides, is preferably between 40 and 50 mole per cent or 19 and 32 per cent by weight, although it may be as high as 37 per cent by weight or 60 mole per cent, as in Example 1. The amount of aluminum fluoride will, resultantly, have the limits of 10 and 20 per cent by weight and 20 and 30 mole per cent, and the amount of magnesium fluoride will be between 2 and 15 per cent by weight and preferably less than 10 per cent.

Having thus described our invention, what we claim is:

1. Optical glass consisting predominantly of compatible fluorides and resulting from fusion of a batch of which beryllium fluoride constitutes between 10 and 25 mole per cent, and the total of aluminum and beryllium fluorides amounts to between 40 and 50 mole per cent.

2. Optical glass consisting predominantly of compatible fluorides and resulting from fusion of a batch of which beryllium fluoride constitutes from 3 to 12 per cent by weight, and the total of beryllium and aluminum fluorides amount to between 19 and 32 per cent by weight.

3. Fluoride optical glass consisting of the compatible fluorides of lead, magnesium, beryllium, and aluminum.

4. Fluoride optical glass resulting from a batch consisting of compatible fluorides and containing by weight: lead fluoride, between 50 and 75 per cent; magnesium fluoride, between 2 and 15 per cent; beryllium fluoride, between 3 and 20 per cent; aluminum fluoride, between 10 and 20 per cent.

5. Fluoride optical glass resulting from fusion of a batch consisting of compatible fluorides and containing by weight: lead fluoride, at least 70 per cent; magnesium fluoride, between 2 and 10 per cent; beryllium fluoride, between 3 and 15 per cent; and aluminum fluoride, between 10 and 20 per cent.

6. Fluoride optical glass resulting from fusion of a batch comprising predominantly the following fluorides present in the weight percentages as given: lead fluoride, at least 50 per cent; magnesium fluoride, between 2 and 15 per cent; beryllium fluoride, between 3 and 20 per cent; aluminum fluoride, between 10 and 20 per cent; the total amount of aluminum and beryllium fluorides being at least 19 per cent.

7. Fluoride optical glass resulting from fusion of a batch comprising predominantly the following fluorides present in the weight percentages as given: lead fluoride, at least 70 per cent; magnesium fluoride, between 2 and 10 per cent; beryllium fluoride, between 3 and 15 per cent; aluminum fluoride, between 10 and 20 per cent; the total of aluminum and beryllium fluorides being between 19 and 25 per cent.

KUAN-HAN SUN.
THOMAS E. CALLEAR.

REFERENCES CITED

The following references are of record in the file of this patent:

FOREIGN PATENTS

| Number | Country | Date |
|---|---|---|
| 8,704 | Great Britain | 1907 |